United States Patent
Lenz et al.

(12) 
(10) Patent No.: US 12,107,291 B2
(45) Date of Patent: Oct. 1, 2024

(54) BATTERY SHELL, TRACTION BATTERY AND MOTOR VEHICLE

(71) Applicant: Kautex Textron Gmbh & Co. KG, Bonn (DE)

(72) Inventors: Stefan Lenz, Bergisch-Gladbach (DE); Hartmut Wolf, Königswinter (DE); Andreas Weimer, Bad Honnef (DE); Georg Enkirch, Salz (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 17/785,651

(22) PCT Filed: Dec. 15, 2020

(86) PCT No.: PCT/EP2020/086133
§ 371 (c)(1),
(2) Date: Jun. 15, 2022

(87) PCT Pub. No.: WO2021/122537
PCT Pub. Date: Jun. 24, 2021

(65) Prior Publication Data
US 2023/0047239 A1 Feb. 16, 2023

(30) Foreign Application Priority Data
Dec. 18, 2019 (DE) .......... 10 2019 134 937

(51) Int. Cl.
*H01M 50/262* (2021.01)
*H01M 50/224* (2021.01)
*H01M 50/249* (2021.01)

(52) U.S. Cl.
CPC ....... *H01M 50/262* (2021.01); *H01M 50/224* (2021.01); *H01M 50/249* (2021.01); *H01M 2220/20* (2013.01)

(58) Field of Classification Search
CPC . H01M 50/224; H01M 50/249; H01M 50/262
See application file for complete search history.

(56) References Cited

U.S. PATENT DOCUMENTS 9,722,223 B1 * 8/2017 Maguire ................. B60L 50/64
11,370,492 B2 * 6/2022 Greber ................... B60K 11/00
(Continued)

FOREIGN PATENT DOCUMENTS

CN 207896174 U 9/2018
CN 108630850 A 10/2018
(Continued)

OTHER PUBLICATIONS

International Search Report, PCT Application No. PCT/EP2020/086133, mailed Apr. 13, 2021 (4 pages).
(Continued)

*Primary Examiner* — Jonathan G Jelsma
(74) *Attorney, Agent, or Firm* — Occhiuti & Rohlicek LLP (57) ABSTRACT

The invention relates to a battery shell, in particular a battery shell of a traction battery, the battery shell being formed from plastics material, the battery shell having a fastening system for fastening a component to the battery shell, the fastening system having a guide rail, an inner profile and a fastening element, the guide rail being integrally or interlockingly connected to the battery shell, the inner profile being guided by the guide rail, the fastening element being designed to establish a connection between the component and the inner profile.

19 Claims, 8 Drawing Sheets

(56) References Cited

U.S. PATENT DOCUMENTS

| | | | |
|---|---|---|---|
| 2007/0087266 A1* | 4/2007 | Bourke | H01M 50/505 |
| | | | 429/61 |
| 2012/0103714 A1* | 5/2012 | Choi | B60K 1/04 |
| | | | 180/68.5 |
| 2017/0346052 A1* | 11/2017 | Weber | H01M 50/242 |
| 2017/0355255 A1 | 12/2017 | Brausse et al. | |
| 2020/0185671 A1* | 6/2020 | Ng | H01M 50/308 |
| 2021/0273285 A1* | 9/2021 | Bluemel | H01M 50/209 |

FOREIGN PATENT DOCUMENTS

| | | |
|---|---|---|
| CN | 108807727 A | 11/2018 |
| CN | 208521970 U | 2/2019 |
| CN | 110233216 A | 9/2019 |
| CN | 110395101 A | 11/2019 |
| DE | 102006048291 A1 | 2/2008 |
| DE | 102013217836 A1 | 3/2015 |
| DE | 102015203952 A1 | 6/2016 |
| DE | 102016009973 A1 | 2/2017 |
| DE | 102016225662 A1 | 6/2018 |
| DE | 102017204531 A1 | 9/2018 |
| DE | 102019100955 A1 | 7/2019 |
| DE | 102018128977 A1 | 5/2020 |
| JP | 2010153129 A | 7/2010 |
| JP | 2019212395 A | 12/2019 |

OTHER PUBLICATIONS

International Preliminary Report on Patentability, PCT Application No. PCT/EP2020/086133, mailed Dec. 20, 2021 (6 pages).

* cited by examiner

BATTERY SHELL, TRACTION BATTERY AND MOTOR VEHICLE

CROSS REFERENCE TO RELATED APPLICATIONS

This application is a 371 national phase of PCT Application No. PCT/EP2020/086133, filed Dec. 15, 2020, which claims the benefit of the filing date of German Application No. 102019134937.0, filed Dec. 18, 2019, the contents of which are hereby incorporated by reference in their entirety.

The present invention relates to a battery shell, to a traction battery and to a motor vehicle.

A battery, in particular a traction battery for storing energy in a motor vehicle, consists of a large number of component parts. One of the tasks of a battery housing is to fasten and protect battery modules and other required components.

Secure attachment of battery modules and other components to the battery housing under all operating conditions and over the life of the battery is of great importance in order to absorb and dissipate inertial forces that occur.

The object of the invention is to provide an improvement over or an alternative to the prior art.

The object of the present invention is achieved by a battery shell having the features of claim 1. Advantageous embodiments of the battery shell are described in the dependent claims.

More precisely, the object of the present invention is achieved by a battery shell, in particular by a battery shell of a traction battery, the battery shell being formed from plastics material, the battery shell having a fastening system for fastening a component to the battery shell, the fastening system having a guide rail, an inner profile and a fastening element, the guide rail being integrally or interlockingly connected to the battery shell, the inner profile being guided by the guide rail, the fastening element being designed to establish a connection between the component and the inner profile.

In this regard, the following is explained conceptually:

First of all, it should be expressly pointed out that in the context of the present patent application, indefinite articles and numbers such as "one," "two" etc. should generally be understood as "at least" statements, i.e., as "at least one . . . ," "at least two . . . " etc., unless it is expressly stated from the relevant context or it is obvious or technically imperative to a person skilled in the art that only "exactly one . . . ," "exactly two . . . " etc. can be meant.

In the context of the present patent application, the expression "in particular" is always to be understood in such a way that an optional, preferred feature is introduced with this expression. The expression is not to be understood as "specifically" or "namely."

A "battery shell" is understood to mean a housing part of a battery. In particular, a battery shell is designed to accommodate components of a battery so that they can be protected and/or fastened by the battery shell.

A "traction battery" is understood to be an energy storage device, in particular an energy storage device for electrical power. A traction battery is preferably suitable for installation in and for driving electric cars.

A "fastening system" is understood to mean a system for fastening at least one component part to at least one other component part. A fastening system itself can preferably have a plurality of component parts, in particular a guide rail, an inner profile and at least one fastening element.

In a preferred embodiment, a fastening system can be suitable for connecting at least one component to a battery shell.

Among other things, it is specifically conceivable that a battery module can be connected to a battery shell by means of a fastening system. Furthermore, a control module and/or a cooling device and/or an electrical line and/or the like can also be connected to the battery shell by means of a fastening system.

Alternatively, it is also conceivable for a battery shell to be able to be fastened in a motor vehicle by means of a fastening system.

A "guide rail" is understood to mean a component part which is designed to guide an inner profile.

A guide rail is preferably integrally or interlockingly connected to a battery shell, in particular integrated into a battery shell. The guide rail is preferably connected to the battery shell made of plastics material in such a way that any forces and moments acting on the guide rail can be transferred to the battery shell.

Optionally, a guide rail has a cross section that is constant along the direction of longitudinal extent of the guide rail.

A guide rail preferably consists predominantly of metal, in particular steel or aluminum or copper.

Alternatively, a guide rail consists predominantly of plastics material, in particular of polyamide. A guide rail preferably consists of a polymer and a textile fabric, in particular a fiber reinforcement and/or a long fiber reinforcement and/or a continuous fiber reinforcement.

A guide rail is preferably produced by extrusion, pultrusion, extrusion or rolling.

An "internal profile" is understood to mean a rod-shaped component part which is formed in such a way that it can be inserted into a guide rail, preferably in the direction of longitudinal extent of the guide rail.

The inner profile preferably has a cross section which is predominantly constant along the direction of longitudinal extent of the inner profile.

In a preferred embodiment, the cross section of the inner profile and the cross section of the guide rail which is intended for the inner profile to be able to be inserted thereinto correspond in such a way that there is no frictional connection between the inner profile and the guide rail, at least not as long as no component is connected to the battery shell via the fastening system.

An inner profile is preferably made of metal, in particular aluminum or steel or copper. In an alternative embodiment, an inner profile can also be made of plastics material.

An inner profile is preferably produced by extrusion, pultrusion, extrusion or rolling.

A "fastening element" is understood to mean any element which is designed for fastening a component, in particular a screw, a thread, a threaded insert, a nut, a washer, a threaded bolt, a weld nut, a weld bolt, a locking hook, a clip, a cable tie, a line holder, a cable holder, a fir tree clip or the like.

For a fastening element, in particular a threaded sleeve with a taper should be considered, which advantageously enables self-centering assembly of the components.

A "component" is understood here to mean a component part in the form of a single part or an assembly consisting of a plurality of parts, in particular a battery module, a control module, a cooling device, an electrical line or the like. Furthermore, a component can also be understood to mean a frame structure by means of which a battery shell can be connected to a motor vehicle. A fastening system is therefore preferably designed to connect components inside the battery shell and/or outside the battery shell to the battery shell.

Traction batteries comprising a battery shell made of metal are known in the prior art. The battery shells alone have a large number of components with a comparatively high level of vertical integration. Since metal materials have comparatively low elasticity, battery shells from the prior art have to have high requirements for the shape and position tolerances of each individual component part. Furthermore, metal materials can only be formed within comparatively narrow limits, resulting in a high overall number of parts for a traction battery from the prior art, as a result of which the associated handling effort during production is comparatively high.

Overall, this results in high unit costs for a traction battery and high investment costs for the required production facilities.

Deviating from the prior art, a battery shell is proposed here which is formed from plastics material.

As a result, the number of component parts required for a battery shell can be drastically reduced, which also reduces the unit costs for a battery shell and the investment costs for producing a traction battery. Furthermore, the handling effort in the production of a traction battery and, consequently, the cycle time in the production of a battery shell can be reduced as a result.

Furthermore, it is specifically proposed here that the battery housing has a fastening system which consists at least of a guide rail, an inner profile and a fastening element.

It is proposed that the guide rail is integrally and/or interlockingly connected to the battery shell, so that the guide rail, which is used, among other things, to introduce the loads absorbed in the fastening system, in particular in the form of longitudinal and/or lateral accelerations, into the battery shell, can be connected directly to the battery shell made of plastics material during production thereof.

As a result, the effort for production, in particular by reduction of the number of inserts and associated reduction in cycle time and automation effort, can be further reduced and a secure connection between the fastening system and the battery shell can be produced.

Furthermore, the battery shell can be reinforced by the integral or interlocking connection to the guide rail, as a result of which the loads introduced into the fastening system can be transferred effectively and evenly to the battery shell and the battery shell as such can also be reinforced, as a result of which possible distortion of the battery shell can be advantageously reduced.

According to an optional embodiment, the mechanical anchoring of a guide rail in the battery housing can be improved by using an adhesion promoter between the guide rail and the battery shell.

According to a further optional embodiment, the mechanical anchoring of a guide rail in the battery housing can be improved by controlling the temperature of the guide rail before the integral or interlocking connection to the battery housing.

According to a further optional embodiment, the mechanical anchoring of a guide rail in the battery housing can be improved by pre-structuring the contact surface of the guide rail and/or of the battery shell on the surface thereof between the guide rail and the battery shell.

Among other things, it is proposed here that the contact surface of the guide rail, i.e., the surface that is designed to form an interlocking connection with the battery shell, is pre-structured.

Furthermore, it should also be considered that, in one embodiment, the battery shell is pre-structured on its contact surface with the guide rail, i.e., the surface that forms an interlocking connection with the guide rail in a designated manner.

An embodiment is also conceivable in which both the contact surface of the guide rail and the contact surface of the battery shell are pre-structured.

"Pre-structuring" is understood here to mean that the battery shell and/or the guide rail is pre-treated by means of a structuring process or already has pre-structuring, as a result of which the contact surface is larger overall than the contact surface in the case of a planar contact surface of the otherwise similarly designed guide rail and/or the otherwise similarly designed battery shell.

Advantageously, a battery shell with an uninterrupted plastics material wall, which can ensure the tightness of the battery shell, can also be achieved using a battery shell according to the features of claim 1.

Optionally, the battery shell is produced using an injection molding process or a pressing process or a blow molding process.

In this regard, the following is explained conceptually:

An "injection molding process" is understood to mean a primary shaping process, in which the material to be processed, in particular plastics material, is liquefied by means of an injection molding machine and injected under pressure into a mold, i.e., the injection mold. In the injection molding tool, the material returns to its solid state as a result of cooling and/or a cross-linking reaction and can be removed as a component part after the tool has been opened.

A "pressing process" is understood to mean a primary shaping process in which the molding compound is introduced into the cavity of an associated pressing tool in a first step, with the pressing tool being closed in a second step, in particular using a pressure piston. By closing the pressing tool, the molding compound acquires the shape specified by the pressing tool. The pressing tool is preferably temperature-controlled. For a molding compound, a thermoplastics material or a thermosetting material which is optionally mixed with a fiber material, in particular glass fiber, carbon fiber, aramid fiber or the like, should be considered. In particular, a pressing process can also be understood as a direct compounding process (D-LFT), in which a fiber material is fed into an extruder, where it is impregnated with the already melted matrix polymer, in particular a thermoplastics material or a thermosetting material, and is transferred into an injection piston and is then introduced into the pressing tool as a molding compound.

A "blow molding process" is understood to mean a process in which a preform is first produced from a molding compound, in particular by injection molding or by forming from a nozzle, and said preform is introduced into a blow molding tool and formed in said tool by introducing a fluid.

Advantageously, an established production method for a battery shell according to claim 1 can thus be used, as a result of which costs can be saved and the process risk of the production process can be minimized.

In a preferred embodiment, the guide rail has a proportion of at least 90 wt. % metal, preferably a proportion of at least 95 wt. % metal, particularly preferably a proportion of at least 98 wt. % metal.

In this regard, the following is explained conceptually:

A "metal" is understood to mean any substance, in particular an alloy, which has the following four characteristic metal substance properties in solid and/or liquid form: electrical conductivity, thermal conductivity, ductility and metallic luster. A metal is preferably understood to be steel or aluminum or copper.

Optionally, the metal proportion of the guide rail is at least 60 wt. % of the guide rail, preferably the metal proportion of the guide rail is at least 70 wt. % of the guide rail, particularly preferably the metal proportion of the guide rail is at least 80 wt. % of the guide rail.

Among other things, it is proposed here that the guide rail consists substantially of a material with a high surface hardness, in particular Rockwell hardness, so that a frictional connection, established by a fastening element, between a component and the corresponding contact surface of the guide rail does not lead to damage to the guide rail.

In particular, it is proposed that the guide rail can be extruded from a metal material, preferably aluminum. In this way, a cross section of the guide rail with a comparatively complex geometry can be produced comparatively easily. This allows the cross section of the guide rail to be extensively adapted to the requirements of the fastening system. In particular, by extruding a guide rail, a guide rail can be produced that has a cross section which has both an undercut for the interlocking connection of the battery shell and the guide rail in a first region and an undercut for an interlocking connection of the inner profile and the guide rail in a second region.

Furthermore, it should also be considered that a substantially metal guide rail can be used as a grounding path to vehicle ground for the components that are connected, at least indirectly, to the guide rail.

Advantageously, a guide rail can be produced using a hard material which does not tend to plastic deformation as a result of a frictional connection and is at the same time a good electrical conductor, so that the guide rail can advantageously also be used as a grounding path. In addition, it can be advantageously achieved that a guide rail can be extruded and complex functional cross sections for the guide rail are also possible.

It is expressly pointed out that the above values for the metal proportion of the guide rail should not be understood as strict limits, but rather they should be able to be exceeded or fallen below on an engineering scale without departing from the described aspect of the invention. In simple terms, the values are intended to provide an indication of the size of the range proposed here for the metal proportion of the guide rail.

According to an optional embodiment, the guide rail has a proportion of at least 90 wt. % plastics material, preferably a proportion of at least 95 wt. % plastics material, particularly preferably a proportion of at least 98 wt. % plastics material.

In this regard, the following is explained conceptually:

A "plastics material" is understood to mean a material that mainly consists of macromolecules. In particular, a plastics material is understood to mean a thermoplastics material, a thermosetting material or an elastomer.

Optionally, the plastics material proportion of the guide rail is at least 60 wt. % of the guide rail, preferably the plastics material proportion of the guide rail is at least 70 wt. % of the guide rail, particularly preferably the plastics material proportion of the guide rail is at least 80 wt. % of the guide rail.

As an alternative, a guide rail is now proposed here which consists predominantly of plastics material, in particular of polyamide. A guide rail is preferably also considered here which, in addition to a polymer, also has a fiber proportion.

Furthermore, it should also be specifically considered here that the guide rail proposed here has a plastics material that is compatible with the plastics material from which the battery shell is formed, so that an integral connection can be produced between the battery shell and the guide rail.

Advantageously, through the use of plastics material, a comparatively light guide rail can be produced, which can have a complex functional cross section and can be produced using established production processes. Furthermore, a battery shell which merges integrally into the guide rail can advantageously be produced indirectly in this way.

It is expressly pointed out that the above values for the plastics material proportion of the guide rail should not be understood as strict limits, but rather they should be able to be exceeded or fallen below on an engineering scale without departing from the described aspect of the invention. In simple terms, the values are intended to provide an indication of the size of the range proposed here for the plastics material portion of the guide rail.

The inner profile preferably has a proportion of at least 90 wt. % metal, preferably a proportion of at least 95 wt. % metal, particularly preferably a proportion of at least 98 wt. % metal.

Optionally, a metal portion of the inner profile is at least 60 wt. % of the inner profile, preferably the metal portion of the inner profile is at least 70 wt. % of the inner profile, particularly preferably the metal portion of the inner profile is at least 80 wt. % of the inner profile.

An inner profile is now specifically proposed here which consists substantially of metal, in particular of steel, aluminum or copper.

Advantageously, an inner profile that can be easily produced by a production process that is established through usability, in particular extrusion and rolling, can be produced which is inexpensive and also has a high level of hardness, so that forces introduced in a punctiform manner via a fastening element can be transferred effectively to the structure of a fastening system and thus indirectly also to the battery shell.

Furthermore, the inner profile can advantageously be used as a grounding path for the components fastened using the fastening system.

It should be expressly pointed out that the above values for the metal proportion of the inner profile should not be understood as strict limits, but rather they should be able to be exceeded or fallen below on an engineering scale without departing from the described aspect of the invention. In simple terms, the values are intended to provide an indication of the size of the range proposed here for the metal proportion of the inner profile.

At least one fastening element is optionally pressed into the inner profile.

In this regard, the following is explained conceptually:

"Pressing in" is understood to mean a joining process in which a part to be joined and a partner to be joined are substantially only elastically deformed during joining and, after joining, unwanted loosening of the part to be joined and partner to be joined is prevented by means of a frictional connection. Longitudinal and lateral forces can preferably be frictionally transferred between the part to be joined and the partner to be joined.

Specifically, a threaded sleeve should be considered here, which, for example, is pressed into an inner profile, as a result of which the fastening element, in particular the threaded sleeve, can be captively connected to the inner profile. Furthermore, the forces introduced into the fastening element in a punctiform manner, in particular forces with a sometimes high dynamic component, can advantageously be effectively transferred to the inner profile.

According to a preferred embodiment, the inner profile has at least one translational degree of freedom relative to the guide rail, preferably at least two translational degrees of freedom, particularly preferably three translational degrees of freedom.

In this regard, the following is explained conceptually:

A "translational degree of freedom" is understood to mean a translational freedom of movement of a body in space in one direction.

Here it is specifically proposed, among other things, that there is no frictional connection between the guide rail and the inner profile, at least as long as a force is not introduced into the inner profile via a corresponding fastening element.

This allows the inner profile to be easily inserted into the guide rail.

Furthermore, it is proposed that the inner profile is mounted in the guide rail with at least one translational degree of freedom, preferably two translational degrees of freedom and particularly preferably three translational degrees of freedom. This creates mobility between the inner profile and the guide rail, and this can be used during assembly of the components to compensate for tolerances between the component and the battery shell, so that the assembly time for a traction battery can be reduced.

Advantageously, the assembly of a traction battery can be facilitated and the shape and position tolerance required of the battery shell can be increased, so that the production costs for the battery shell formed from plastics material can also be reduced.

A preferred embodiment can be achieved by the inner profile and/or the guide rail having an electrically conductive connection between the component and vehicle ground.

In this regard, the following is explained conceptually:

An "electrically conductive connection" is understood to mean any connection between two bodies through which an electric current can flow.

"Vehicle ground" is understood to mean a body which conducts electrical current and which is assigned as a reference potential for all signal and operating voltages.

Functional integration can advantageously be carried out in this way, so that the functions of fastening and grounding the components can be undertaken by the fastening system.

In this way, component parts can advantageously be saved and the assembly times can be reduced, resulting in overall cost savings.

According to a second aspect of the invention, the object is achieved by a traction battery, in particular a traction battery for a motor vehicle, having a battery shell having the features of claim 1, it being possible for preferred embodiments to be achieved by a battery shell having the features of a claim dependent on claim 1.

It goes without saying that the advantages of a battery shell described above extend directly to a traction battery, in particular a traction battery for a motor vehicle having such a battery shell.

It should be expressly noted that the subject matter of the second aspect can advantageously be combined with the subject matter of the preceding aspects of the invention, both individually or cumulatively in any combination.

According to a third aspect of the invention, the object is achieved by a motor vehicle that has a battery shell having the features of claim 1, it being possible for preferred embodiments to be achieved by a battery shell having the features of a claim dependent on claim 1.

In this regard, the following is explained conceptually:

A "motor vehicle" is understood to mean a vehicle driven by a motor. A motor vehicle is preferably not mounted on a rail or at least not permanently track-mounted.

It goes without saying that the above-described advantages of a battery shell extend directly to a motor vehicle which has such a battery shell.

It should be expressly noted that the subject matter of the third aspect can advantageously be combined with the subject matter of the preceding aspects of the invention, both individually or cumulatively in any combination.

Further advantages, details, and features of the invention can be found below in the described embodiments. The drawings show, in detail, the following.

In the following description, the same reference signs denote the same component parts or features; in the interest of avoiding repetition, a description of a component made with reference to one figure also applies to the other figures. Furthermore, individual features that have been described in connection with one embodiment can also be used separately in other embodiments.

Figure 1:
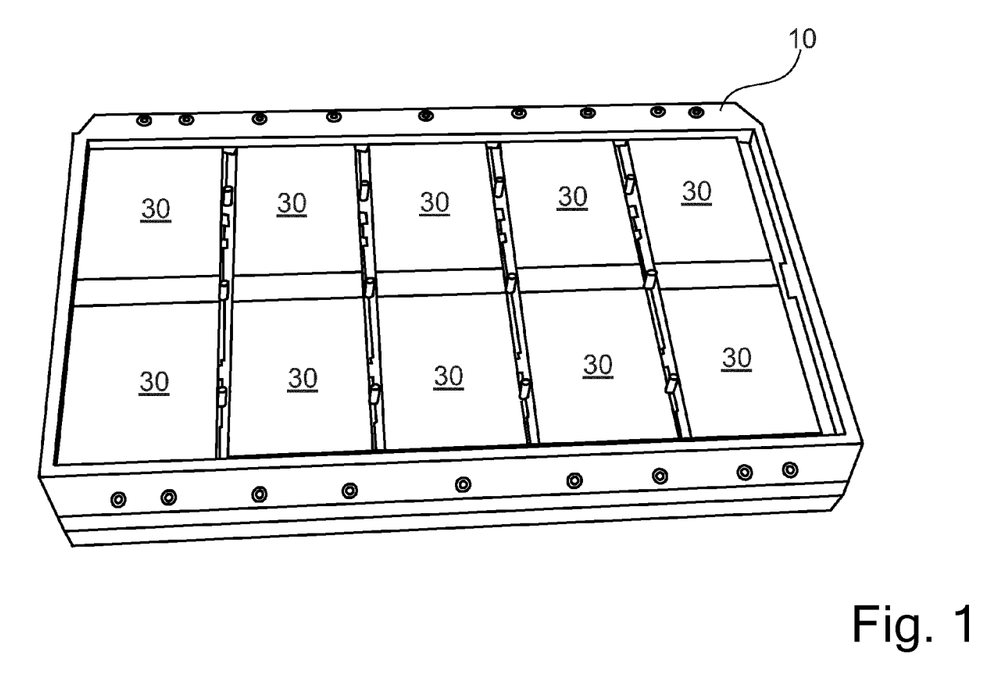
FIG. 1: schematically shows a battery shell of a traction battery according to the prior art, the battery shell consisting substantially of metal.

A battery shell 10 of a traction battery (not labeled) according to the prior art in FIG. 1 is substantially made of metal.

The battery shell 10 is designed to fasten and protect the components 30. In order to absorb and dissipate any inertial forces that may occur, in particular during the longitudinal and/or lateral acceleration of a vehicle (not shown) equipped with a traction battery (not labeled), it is important to securely fix the components 30 to the battery shell 10 under all operating conditions and over the service life of a traction battery (not labeled). This applies in particular to components 30 which are very heavy.

The components 30 of the traction battery (not labeled) are fastened to the battery shell 10 in FIG. 1 by means of a plurality of fastening elements (not labeled), in particular by screws. Due to the large number of components 30 to be fastened, a large number of fastening elements (not labeled) are required to fasten the components 30 to the battery shell 10.

Figure 2:
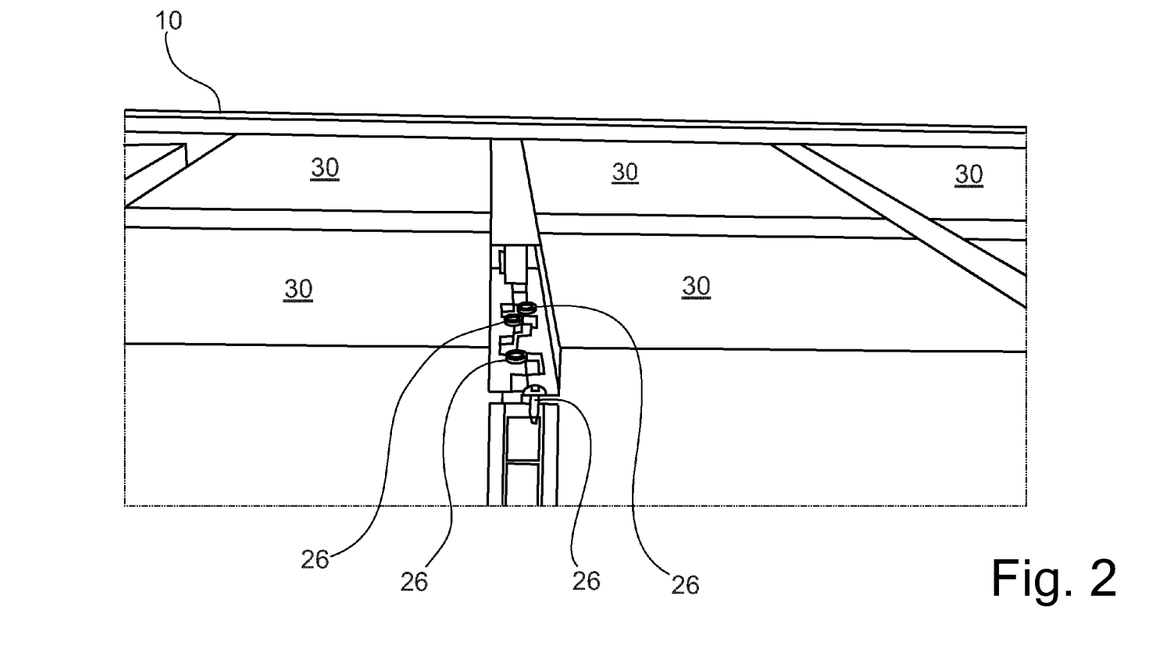
FIG. 2: schematically shows a detailed view of a battery shell according to the prior art.

The traction battery (not labeled) in FIG. 2 is substantially designed in such a way that the components 30 are fastened to the battery shell 10 by means of fastening elements 26 in the form of screws. The battery housing 10 is made substantially of metal and has a frame construction, so that the fastening elements 26 in the form of screws 26 are screwed into a metal frame (not labeled), in particular into a cross member (not labeled) of a metal frame (not labeled).

Since compliance with tight tolerances for each fastening element 26 is important in the case of such solutions known in the prior art, there is a high manufacturing outlay, which is reflected in the form of high investment costs and unit costs.

Figure 3:
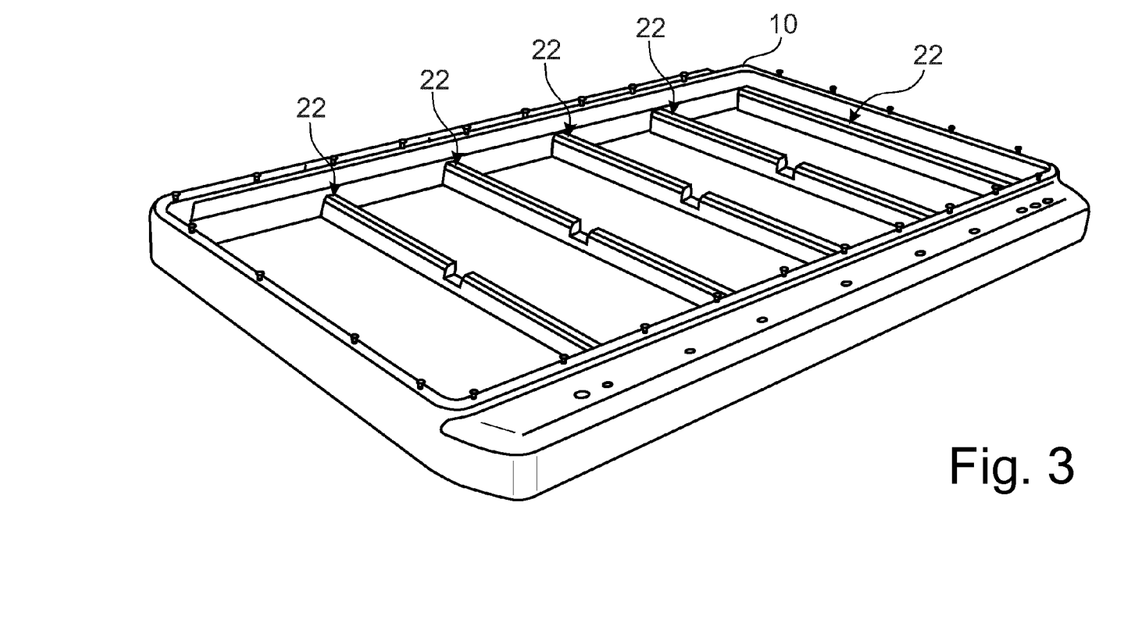
FIG. 3: schematically shows a battery shell made of plastics material having a fastening system.

The battery shell 10 according to the invention in FIG. 3 is formed substantially from plastics material. The plastics material can be formed either in a single layer or in multiple layers. In particular, the battery shell 10 can have a barrier layer (not shown).

The battery shell 10 in FIG. 3 is preferably formed by means of an injection molding process, a pressing process, a blow molding process or the like.

The battery shell 10 has a plurality of guide rails 22 which are designed to fasten components (not shown) to the battery shell 10.

The guide rails 22 are arranged on cross members (not labeled) and are therefore elevated relative to the base (not labeled) of the battery shell 10. The cross members (not labeled) are also made of plastics material and are formed together with the battery shell 10. The elevated design of the cross members (not labeled) can simplify the assembly of the components (not shown) and help ensure that the components (not shown) cannot slip relative to the battery shell 10 when longitudinal and/or lateral forces occur.

In particular, it should be specifically considered here, among other things, that the guide rails 22 are connected to the battery shell 10 via an interlocking connection and/or an integral connection. An interlocking connection between a guide rail 22 and the battery shell 10 can be brought about in particular by the plastics material from which the battery shell 10 is made physically engaging with the guide rail 22 in the manner of claws. In particular, the guide rail 22 can have an undercut (not shown) for this purpose.

Figure 4:
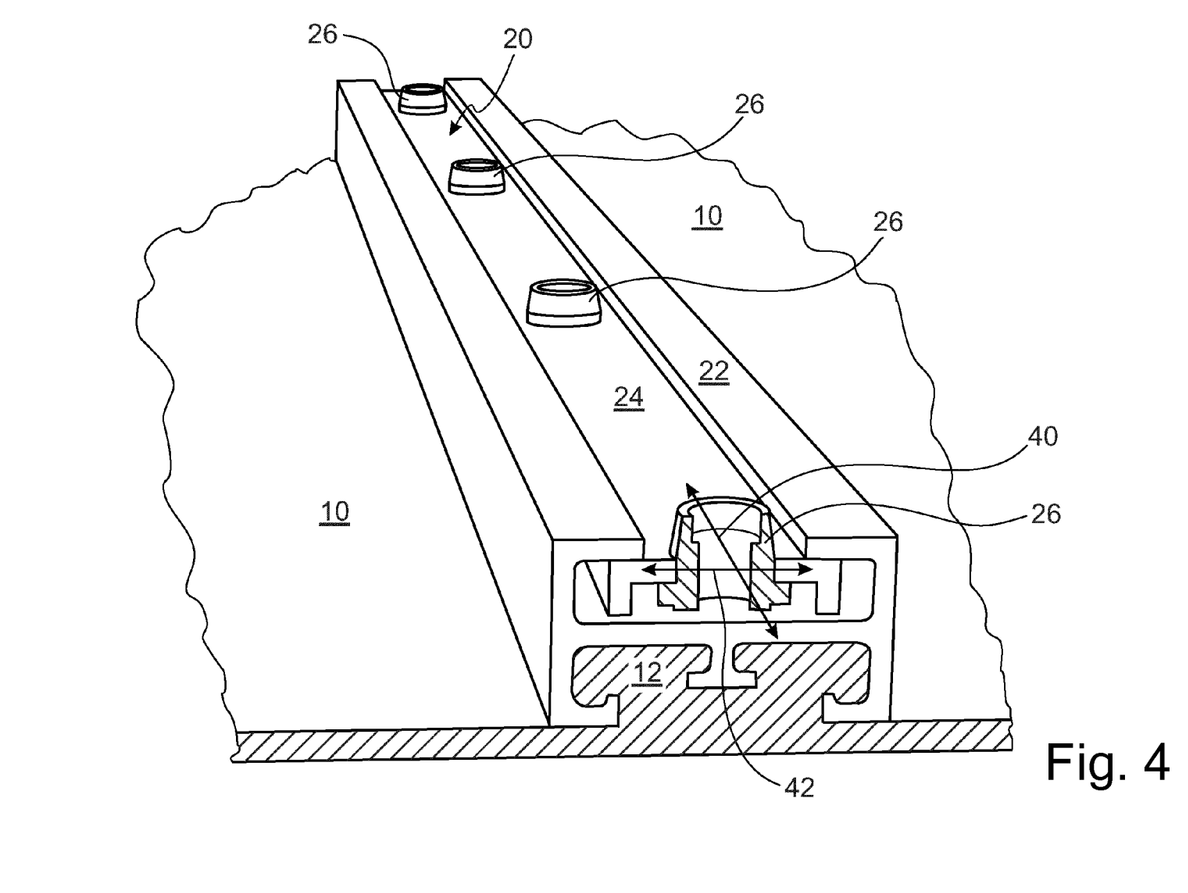
FIG. 4: schematically shows a fastening system for a battery shell made of plastics material with a fastening system arranged close to the ground.

The fastening system 20 in FIG. 4 consists substantially of a guide rail 22 which is connected to the battery shell 10 by means of an interlocking connection, and of an inner profile 24 and a plurality of fastening elements 26.

The interlocking connection between the guide rail 22 and the battery shell 10 is produced in the guide rail 22 by means of an undercut (not labeled). The undercut (not labeled) is formed in such a way that the plastics material forming the battery shell 10 can penetrate into a region of the guide rail 22 when the battery shell 10 is being formed and can flow around the undercut (not labeled) of the guide rail 22. When the plastics material hardens, the battery shell 10 and the guide rail 22 physically engage in the manner of claws.

The plastics material wall (not labeled) of the battery shell 10 is designed without interruption in the region of the fastening system 20, as a result of which tightness of the battery shell 10 can be ensured.

The arrangement between the battery shell 10 and the fastening system 20 is designed in such a way that the guide rail 22 is arranged on the battery shell 10 close to the ground.

The inner profile 24 is preferably made of metal, but can alternatively also be made of plastics material.

If the inner profile 24 is made of metal, it can be used as a grounding path, as a result of which the components (not shown) that are at least indirectly interconnected can be electrically connected to motor vehicle ground by means of the inner profile 24.

Alternatively, a metal guide rail 22 can also be used as a grounding path for the components (not shown).

The inner profile 24 is designed in such a way that it can be inserted into the guide rail in the longitudinal direction. Preferably, the spatial play between the inner profile 24 and the guide rail 22 is designed in such a way that at least one translational degree of freedom 40, 42 is formed between the inner profile 24 and the guide rail 22, so that there is no frictional connection between the inner profile 24 and the guide rail 22, and the inner profile 24 can be shifted at least in one direction within the guide rail 22.

In a preferred embodiment, the inner profile 24 has at least two translational degrees of freedom 40, 42, particularly preferably three translational degrees of freedom 40, 42, relative to the guide rail 22, so that the inner profile 24 can be moved freely within the guide rail 22 in a limited range in at least two spatial directions, preferably even in three spatial directions, as a result of which any frictional connection between the inner profile 24 and the guide rail 22 can result only from a connection between a component (not shown) and the inner profile 24 and an associated clamping action between the guide rail 22 and the inner profile 24, in particular by an at least indirect screw connection between a component (not shown) and the inner profile 24, preferably by a screw connection between a fastening element 26 and a component (not shown).

When producing the battery shell 10, the inner profile 24 can be inserted into the guide rail 22 before the battery shell 10 is formed from plastics material.

The inner profile 24 can have one or more fastening elements 26. A fastening element 26 can preferably be an internal thread (not shown) formed in the inner profile 24. A fastening element 26 can preferably also be a threaded insert 26. A fastening element 26 is preferably pressed into the inner profile 24.

A fastening element 26 preferably has a taper, which is designed for centering between the fastening element 26 and a component (not shown), as a result of which the assembly of a traction battery (not shown) can also be facilitated, in particular at the connection point between the components (not shown) and the fastening element 26.

The fastening element 26 preferably has an undercut (not labeled), which is designed to enter into a physical engagement with inner profile 24 in the manner of claws, in particular due to the fixed connection to a component (not shown) that is indirectly fastened to the fastening element 26 and the associated clamping action between the fastening element 26 and the inner profile 24. Such an undercut (not labeled) on the fastening element 26 can also lead to the fastening element 26 being captively connected to the fastening system 20, in particular as long as the inner profile 24 is not pulled out of the guide rail 22.

Overall, the fastening system 20 is designed to allow a secure and permanent connection between a component (not shown) and a battery shell 10, it being possible for any tolerances (not shown) between a component (not shown) and the battery shell 10 to be compensated for by means of the fastening system 20, in particular by means of a translational degree of freedom 40, 42 between the guide rail 22 and the inner profile 24.

Figure 5:
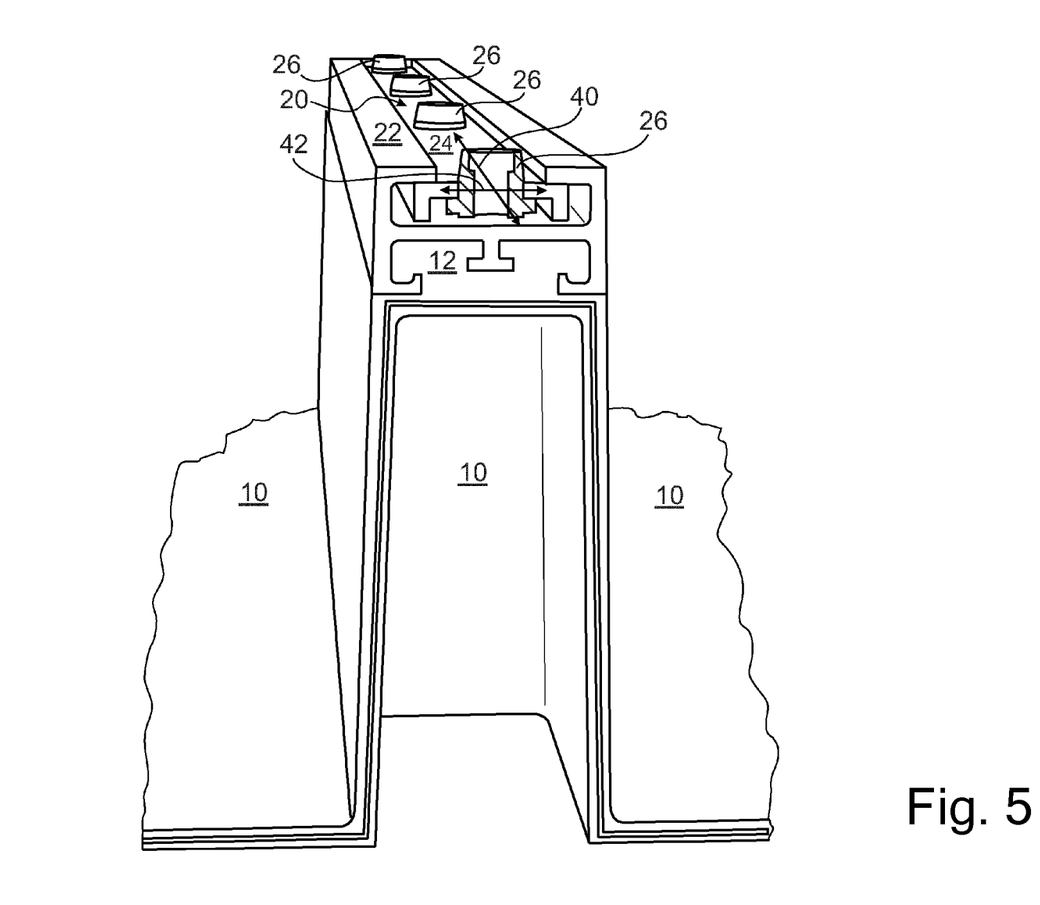
FIG. 5: schematically shows a schematically shows a fastening system for a battery shell made of plastics material, the fastening system being in an elevated arrangement.

The fastening system 20 in FIG. 5 consists substantially of a guide rail 22 which is connected to the battery shell 10 by means of an interlocking connection, and of an inner profile 24 and a plurality of fastening elements 26.

Unlike the guide rail 22 in FIG. 4, the guide rail 22 in FIG. 5 is arranged in such a way that the guide rail 22 is arranged so as to be elevated from the base (not labeled) of the battery shell 10.

The plastics material of the battery shell 10 is multi-layered (not labeled) and has in particular a barrier layer (not labeled) which is designed to prevent permeation of a substance from the battery shell into the area surrounding the battery or from the area surrounding the battery into the battery.

Figure 6:
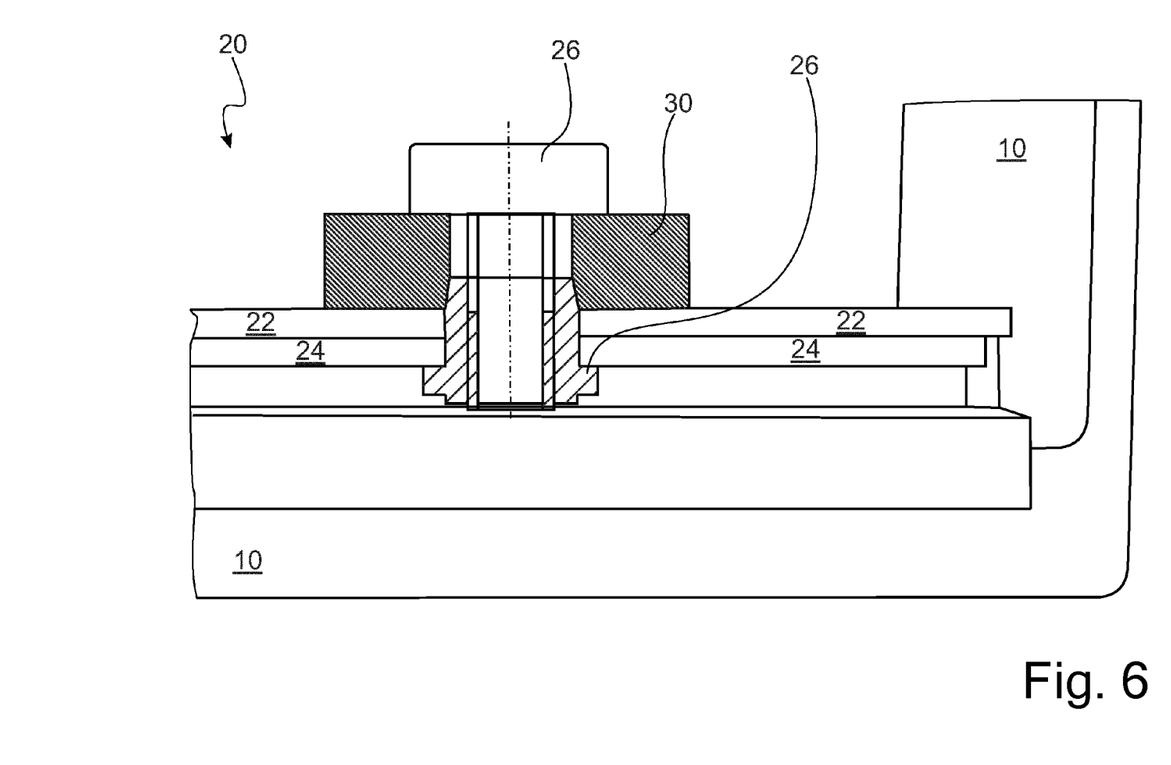
FIG. 6: schematically shows a fastening system in section.

The fastening system 20 in FIG. 6 substantially has a guide rail 22 (shown in section), an inner profile 24 (shown in section) and a fastening element 26.

The fastening system 20 is connected to the battery shell 10 by means of an interlocking connection between the battery shell 10 and the guide rail 22.

The fastening element 26 and the component 30 each have a taper (not labeled), which tapers correspond to one another and support centering between the component 30 and the fastening element 26, as a result of which the assembly of the component 30 can be simplified. For this purpose, the threaded sleeve 26 protrudes beyond the bearing surface (not labeled) on the upper side (not labeled) of the guide rail 22 and is thus designed to be interlockingly inserted in the component 30.

The fastening element 26 preferably consists of a threaded sleeve 26 and a screw 26.

Figure 7:
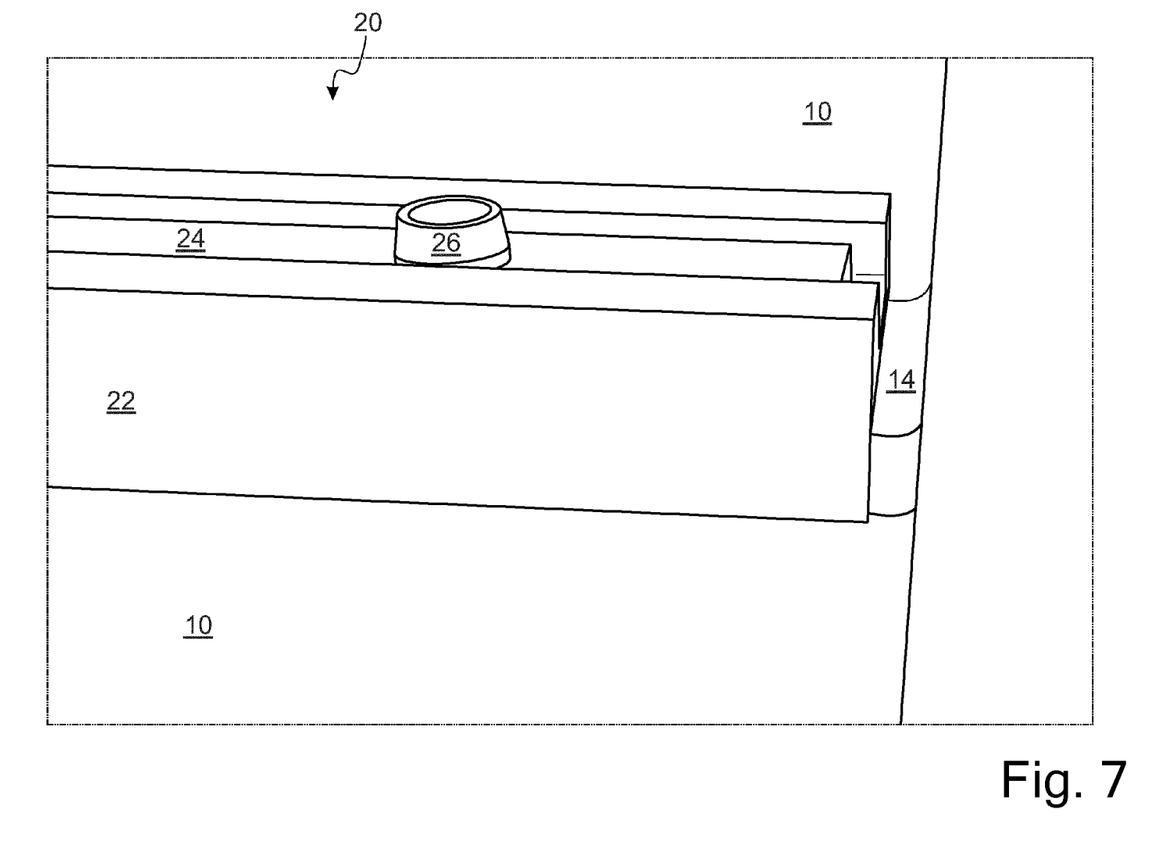
FIG. 7: is a schematic detailed view of a fastening system integrated in a battery shell.

The fastening system 20 in FIG. 7 consists substantially of a guide rail 22 which is connected to the battery shell 10 by means of an interlocking connection, and of an inner profile 24 and a fastening element 26.

When forming the battery shell 10 from plastics material, the shaping tool (not shown) is formed at the end of the guide rail 22 in such a way that a transition region 14 is created between the wall (not labeled) of the battery shell 10 and the guide rail 22. In this way, it is advantageously possible, when the battery shell 10 is being formed, to prevent plastics material from entering the region (not labeled) of the fastening system 20 in which the inner profile 24 is guided by the guide rail 22.

Figure 8:
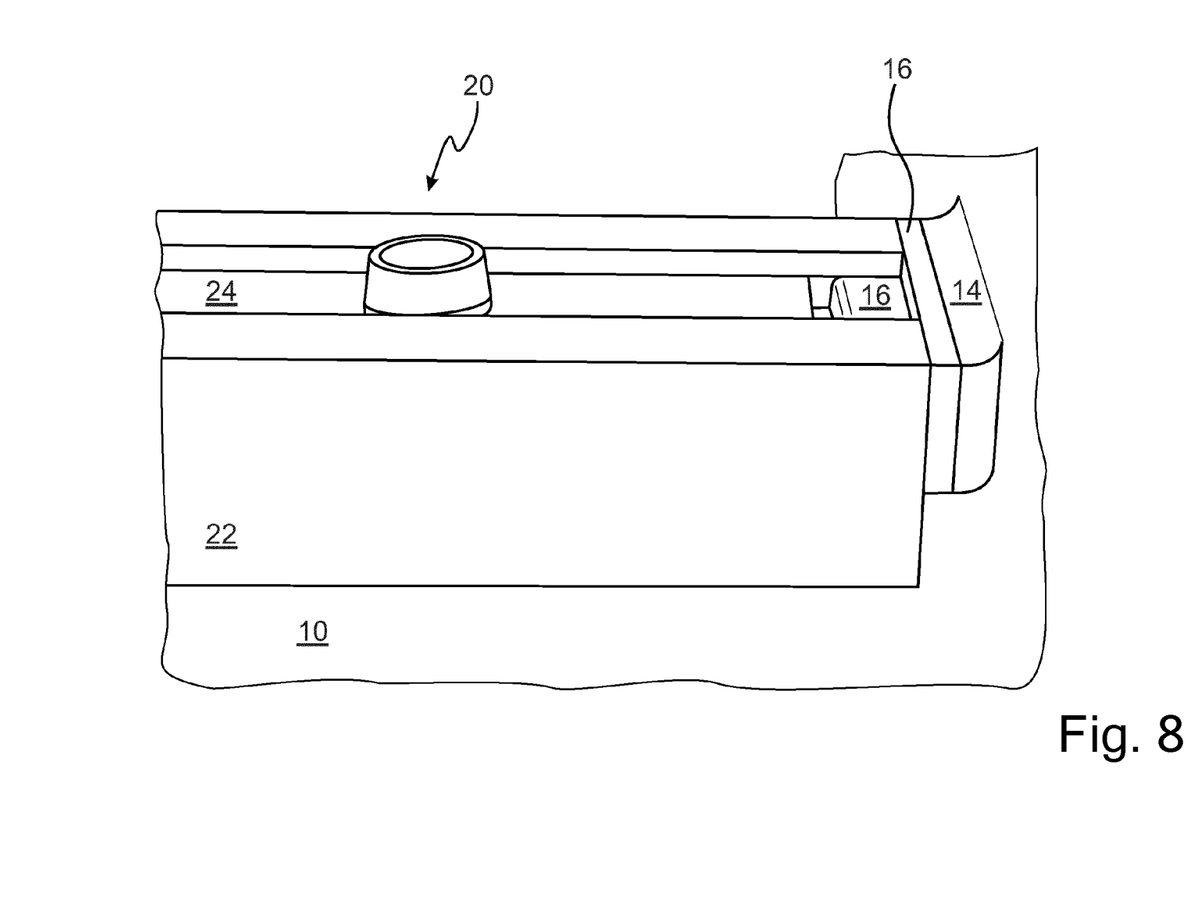
FIG. 8: schematically shows a further detailed view of a fastening system integrated into a battery shell.

The fastening system 20 in FIG. 8 consists substantially of a guide rail 22 which is connected to the battery shell 10 by means of an interlocking connection, and of an inner profile 24 and a fastening element 26.

Before the battery shell 10 is formed, the guide rail 22 is closed laterally with a plug 16 so that when the battery shell 10 is being formed from plastics material, no plastics material enters the region (not labeled) of the fastening system 20 in which the inner profile 24 is guided by the guide rail 22.

The plug 16 is preferably made of a plastics material that is compatible with the plastics material of the battery shell 10, so that an integral connection between the battery shell 10 and the plug 16 can be produced in the region of the plug.

LIST OF REFERENCE SIGNS

10 Battery shell
12 Anchoring
14 Transition region
16 Plug
20 Fastening system
22 Guide rail
24 Inner profile
26 Fastening element
30 Component
40 Translational degree of freedom
42 Translational degree of freedom

The invention claimed is:

1. Battery shell of a traction battery, the battery shell being formed from plastics material, the battery shell having a fastening system for fastening a component that is inside the battery shell to the battery shell, wherein the fastening system has
   a guide rail,
   an inner profile arranged inside the guide rail, and
   a fastening element,
   the guide rail being integrally or interlockingly connected to the battery shell,
   the inner profile being guided by the guide rail, and
   the fastening element being designed to establish a connection between the component, which is inside the battery shell, and the inner profile.

2. Battery shell according to claim 1, wherein the battery shell is produced using a pressing process.

3. Battery shell according to claim 1, wherein the guide rail has a proportion of at least 90 wt. % metal.

4. Battery shell according to claim 1, wherein the guide rail has a proportion of at least 90 wt. % plastics material.

5. Battery shell according to claim 1, wherein the inner profile has a proportion of at least 90 wt. % metal.

6. Battery shell according to claim 1, wherein at least one fastening element is pressed into the inner profile.

7. Battery shell according to claim 1, wherein the inner profile has, relative to the guide rail, at least one translational degree of freedom.

8. Traction battery for a motor vehicle having a vehicle mass and the battery shell according to claim 1.

9. Traction battery according to claim 8, wherein the inner profile and/or the guide rail has an electrically conductive connection between the component and the vehicle mass.

10. Motor vehicle having a battery shell according to claim 1.

11. Battery shell according to claim 1, wherein the guide rail has a proportion of at least 95 wt. % metal.

12. Battery shell according to claim 1, wherein the guide rail has a proportion of at least 98 wt. % metal.

13. Battery shell according to claim 1, wherein the guide rail has a proportion of at least 95 wt. % plastics material.

14. Battery shell according to claim 1, wherein the guide rail has a proportion of at least 98 wt. % plastics material.

15. Battery shell according to claim 1, wherein the inner profile has a proportion of at least 95 wt. % of metal.

16. Battery shell according to claim 1, wherein the inner profile has a proportion of at least 98 wt. % metal.

17. Battery shell according to claim 1, wherein the fastening element fastens the component and wherein the fastening element comprises at least one of: a screw, a thread, a threaded insert, a nut, a washer, a threaded bolt, a weld nut, a weld bolt, a locking hook, a clip, a cable tie, a line holder, a cable holder, and a fir tree clip.

18. Battery shell according to claim 1, wherein the battery shell is produced using a blow molding process.

19. Battery shell according to claim 1, wherein the component is one of a plurality of components, all of which are fastened to the battery shell by the fastening system.

* * * * *